United States Patent [19]
Cocca et al.

[11] Patent Number: 5,602,617
[45] Date of Patent: Feb. 11, 1997

[54] LIGHT METERING DEVICE WITH ADJUSTABLE OUTPUT

[75] Inventors: J. David Cocca, Pittsford; Clay A. Dunsmore, Batavia, both of N.Y.

[73] Assignee: Eastman Kodak Company, Rochester, N.Y.

[21] Appl. No.: 401,842

[22] Filed: Mar. 10, 1995

[51] Int. Cl.$^6$ .............................. G03B 7/08; G03B 7/083; G01J 1/42

[52] U.S. Cl. ...................... 396/246; 356/224; 352/141; 396/257; 396/213

[58] Field of Search ................... 354/461, 464, 354/446, 449, 450, 416, 414; 356/224

[56] References Cited

U.S. PATENT DOCUMENTS

| | | | |
|---|---|---|---|
| 3,558,892 | 1/1971 | Seeley | 250/205 |
| 3,714,441 | 1/1973 | Kreda | 250/207 |
| 4,031,383 | 6/1977 | Hosoe et al. | 250/201 |
| 4,046,464 | 9/1977 | Shimazaki et al. | 352/141 |
| 4,088,073 | 5/1978 | Crystal et al. | 101/128.4 |
| 4,118,714 | 10/1978 | Okajima et al. | 352/141 |
| 4,598,985 | 7/1986 | Inoue | 354/21 |
| 4,673,807 | 6/1987 | Kobayashi et al. | 250/214 |
| 4,771,309 | 9/1988 | Ogihara et al. | 354/421 |
| 4,809,031 | 2/1989 | Sakaguchi et al. | 354/429 |
| 4,821,036 | 4/1989 | Daffarn | 341/172 |
| 4,821,056 | 4/1989 | Shinoda et al. | 354/289.1 |
| 5,138,149 | 8/1992 | Cadet et al. | 250/214 |
| 5,254,846 | 10/1993 | Fayfield | 250/205 |

*Primary Examiner*—Safet Metjahic
*Assistant Examiner*—Michael Dalakis
*Attorney, Agent, or Firm*—Francis H. Boos, Jr.; Marc Rossi

[57] ABSTRACT

A light metering device incorporates a light dependent resistor as a light sensing element, a network including a plurality of circuit elements, and a selection mechanism for selectively connecting the light dependent resistor to one of the plurality of circuit elements in the network. The selection mechanism is controlled to set a voltage measured at an output terminal of the light dependent resistor within a predetermined threshold level. The light metering device can be readily incorporated in both photographic and electronic cameras.

14 Claims, 7 Drawing Sheets

FIG. 7

| | | min | nom | max | | | | | | |
|---|---|---|---|---|---|---|---|---|---|---|
| | R9 (kΩ) | 14.56 | 2.8 | 45.36 | | | | | | |
| | SLOPE (m) | 0.75 | 0.9 | 1 | | | | | | |
| G#=20 | | | | Rods | bits | | | Rods | bits | | | Rods | bits |
| L (ftC) | L (ftL) | Rmin | (kΩ) | Rmin | Rnom | (kΩ) | Rnom | Rmax | (kΩ) | Rmax |
| 0.10 | 1.9 | 400 | 442 | 122 | 400 | 1683 | 49 | 400 | 4297 | 22 |
| 0.14 | 2.7 | 400 | 340 | 138 | 400 | 1227 | 63 | 400 | 3024 | 30 |
| 0.19 | 3.8 | 400 | 263 | 154 | 400 | 901.8 | 79 | 400 | 2149 | 40 |
| 0.27 | 5.4 | 400 | 202 | 170 | 400 | 657.3 | 97 | 400 | 1512 | 54 |
| 0.39 | 7.7 | 400 | 155 | 185 | 400 | 477.6 | 117 | 400 | 1060 | 70 |
| 0.55 | 10.9 | 400 | 119 | 197 | 400 | 349.3 | 137 | 400 | 749.1 | 89 |
| 0.77 | 15.4 | 400 | 92 | 208 | 400 | 255.9 | 156 | 400 | 530.2 | 110 |
| 1.09 | 21.7 | 80 | 71 | 135 | 80 | 188 | 76 | 80 | 376.3 | 45 |
| 1.54 | 30.7 | 80 | 55 | 152 | 80 | 137.6 | 94 | 80 | 266 | 59 |
| 2.18 | 43.5 | 80 | 42 | 168 | 80 | 100.5 | 113 | 80 | 187.7 | 77 |
| 3.08 | 61.5 | 80 | 33 | 182 | 80 | 73.61 | 133 | 80 | 132.8 | 96 |
| 4.35 | 87 | 80 | 25 | 195 | 80 | 53.87 | 153 | 80 | 93.85 | 118 |
| 6.15 | 123 | 80 | 19 | 206 | 80 | 39.44 | 171 | 80 | 66.38 | 140 |
| 7.90 | 158 | 10 | 16 | 98 | 10 | 31.49 | 62 | 10 | 51.68 | 42 |
| 12.30 | 246 | 10 | 12 | 119 | 10 | 21.14 | 82 | 10 | 33.19 | 59 |
| 17.40 | 348 | 10 | 9 | 136 | 10 | 15.47 | 101 | 10 | 23.46 | 77 |
| 24.60 | 492 | 10 | 7 | 152 | 10 | 11.33 | 120 | 10 | 16.6 | 96 |
| 34.75 | 695 | 10 | 5 | 167 | 10 | 8.301 | 140 | 10 | 11.75 | 118 |
| 49.15 | 983 | 10 | 4 | 182 | 10 | 6.076 | 159 | 10 | 8.306 | 140 |
| 69.55 | 1391 | 10 | 3 | 195 | 10 | 4.445 | 177 | 10 | 5.87 | 161 |

LUT 3 (rows 1–7), LUT 2 (rows 8–13), LUT 1 (rows 14–20)

FIG. 11

| G#= | R9 (KΩ) | | | min | | | | nom | | | | | | | |
|---|---|---|---|---|---|---|---|---|---|---|---|---|---|---|---|
| | SLOPE (m) | | | 14.56 | | | | 2.8 | | | | | | | |
| | 20 | | | 0.75 | | | | 0.9 | | | | | | | |
| L (ftC) | L (ftL) | Icc(mA) | Rods (KΩ) | bits min | Icc(mA) | Rods (KΩ) | bits nom | Icc(mA) | Rods (KΩ) | bits max | | | | | |
| 0.10 | 1.9 | 0.009 | 442.1 | 52 | 0.002 | 1683 | 84 | 0.001 | 4297 | 36 | | | | | |
| 0.14 | 2.7 | 0.009 | 339.7 | 99 | 0.002 | 1227 | 130 | 0.001 | 3024 | 101 | | | | | |
| 0.19 | 3.8 | 0.009 | 262.9 | 135 | 0.002 | 901.8 | 164 | 0.001 | 2149 | 146 | | | | | |
| 0.27 | 5.4 | 0.009 | 202 | 163 | 0.002 | 657.3 | 189 | 0.001 | 1512 | 179 | | | | | LUT 1 |
| 0.39 | 7.7 | 0.009 | 154.8 | 185 | 0.002 | 477.6 | 207 | 0.001 | 1060 | 202 | | | | | |
| 0.55 | 10.9 | 0.009 | 119.3 | 201 | 0.002 | 349.3 | 220 | 0.001 | 749.1 | 218 | | | | | |
| 0.77 | 15.4 | 0.046 | 92.04 | 39 | 0.016 | 255.9 | 46 | 0.008 | 530.2 | 39 | | | | | |
| 1.09 | 21.7 | 0.046 | 71.17 | 88 | 0.016 | 188 | 102 | 0.008 | 376.3 | 102 | | | | | |
| 1.54 | 30.7 | 0.046 | 54.86 | 127 | 0.016 | 137.6 | 143 | 0.008 | 266 | 147 | | | | | |
| 2.18 | 43.5 | 0.046 | 42.24 | 157 | 0.016 | 100.5 | 174 | 0.008 | 187.7 | 179 | | | | | LUT 2 |
| 3.08 | 61.5 | 0.046 | 32.58 | 179 | 0.016 | 73.61 | 196 | 0.008 | 132.8 | 202 | | | | | |
| 4.35 | 87 | 0.046 | 25.12 | 197 | 0.016 | 53.87 | 212 | 0.008 | 93.85 | 218 | | | | | |
| 6.15 | 123 | 0.046 | 19.37 | 210 | 0.016 | 39.44 | 224 | 0.008 | 66.38 | 229 | | | | | |
| 7.90 | 158 | 0.26 | 16.06 | 42 | 0.13 | 31.49 | 46 | 0.08 | 51.68 | 44 | | | | | |
| 12.30 | 246 | 0.26 | 11.52 | 103 | 0.13 | 21.14 | 115 | 0.08 | 33.19 | 120 | | | | | |
| 17.40 | 348 | 0.26 | 8.88 | 138 | 0.13 | 15.47 | 153 | 0.08 | 23.46 | 160 | | | | | |
| 24.60 | 492 | 0.26 | 6.849 | 165 | 0.13 | 11.33 | 181 | 0.08 | 16.6 | 188 | | | | | LUT 3 |
| 34.75 | 695 | 0.26 | 5.286 | 186 | 0.13 | 8.301 | 201 | 0.08 | 11.75 | 208 | | | | | |
| 49.15 | 983 | 0.26 | 4.076 | 202 | 0.13 | 6.076 | 216 | 0.08 | 8.306 | 222 | | | | | |
| 69.55 | 1391 | 0.26 | 3.141 | 214 | 0.13 | 4.445 | 226 | 0.08 | 5.87 | 232 | | | | | |

LIGHT METERING DEVICE WITH ADJUSTABLE OUTPUT

FIELD OF THE INVENTION

The invention relates in general to light metering devices. More specifically, the invention relates to a light metering device that includes a light dependent resistor, having a resistance that varies in proportion to the amount of light incident thereon, and a mechanism for adjusting the output of the light metering device based on the signal response of the light dependent resistor.

BACKGROUND OF THE INVENTION

Light dependent resistors having a resistance that varies in proportion to the amount of light incident thereon are commonly utilized in light metering devices employed in cameras. Examples of light dependent resistors include cadmium sulfide cells, cadmium selenide cells and sulfoselenide cells, all of which can be employed as light detectors. The use of light dependent resistors is desirable due to their low cost. The response of light dependent resistors, however, have a large degree of variability with respect to resistance tolerance and sensitivity. In addition, the response of light metering devices employing light dependent resistors is compressed in some areas when working over large light level ranges due to the response characteristics of the light dependent resistors.

In view of the above, it is an object of the invention to provide a light metering device that incorporates a light dependent resistor as a light sensing element, which can maintain its sensing function on a linear dynamic operating range over a broad range of light levels.

SUMMARY OF THE INVENTION

The invention provides a light metering device that incorporates a light dependent resistor as a light sensing element, a network including a plurality of circuit elements, and a selection mechanism for selectively connecting the light dependent resistor to one of the plurality of circuit elements in the network. The selection mechanism is controlled to set a voltage measured at an output terminal of the light dependent resistor within a predetermined threshold level. The light metering device can maintain sensing function on a linear dynamic operation range over a broad range of light levels, and can be readily incorporated into both photographic and electronic cameras.

BRIEF DESCRIPTION OF THE DRAWINGS

The invention will be described in greater detail with reference to certain preferred embodiments thereof and the accompanying drawings, wherein:

FIG. 7 illustrates three LUTs containing information related to the response of the device illustrated in FIG. 5 for each of the three illustrated resistors contained therein;

FIG. 11 illustrates LUTs corresponding to the current sources I1–I3 illustrated in FIG. 9.

DETAILED DESCRIPTION OF THE PREFERRED EMBODIMENTS

Figure 1:
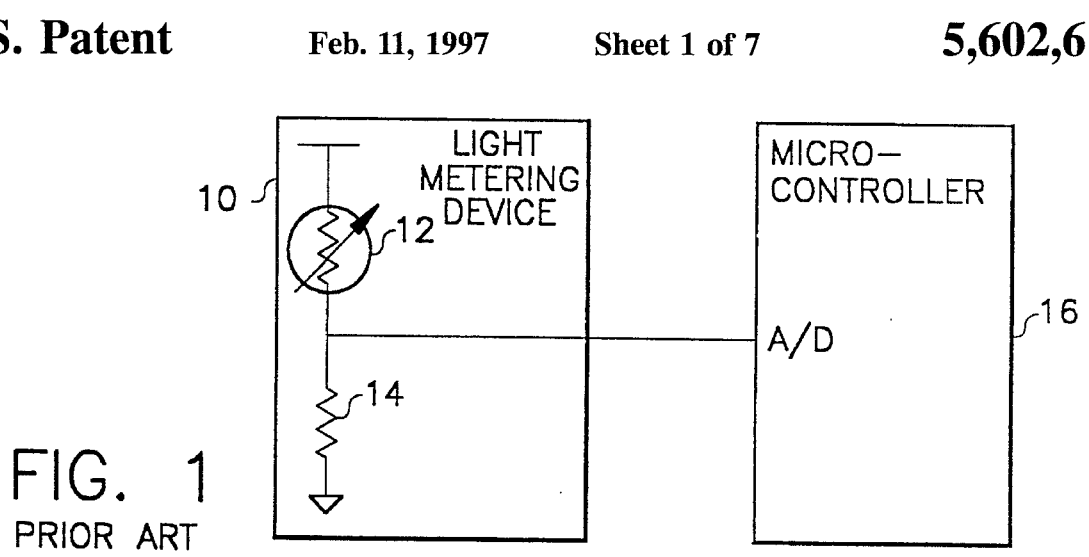
FIG. 1 illustrates a conventional light metering device employing a fixed resistor circuit.
Figure 2:
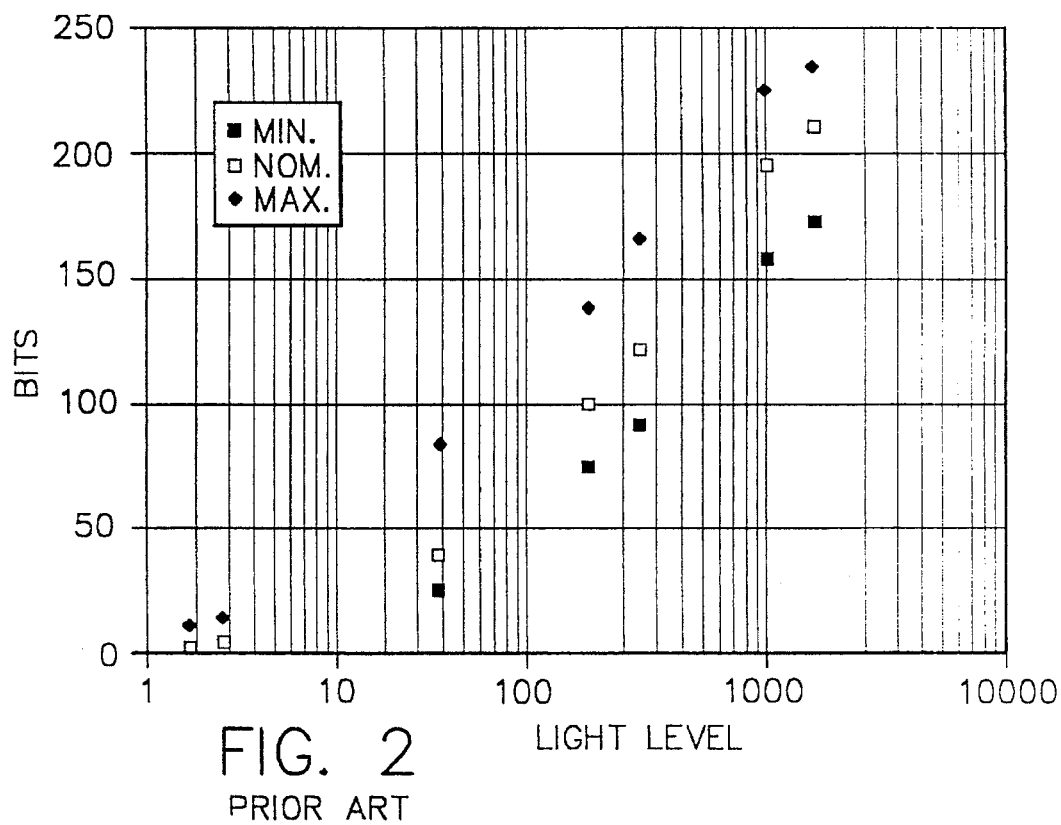
FIG. 2 is a graph illustrating a bit count versus light level response from minimum, nominal and maximum specified CdS cells to be utilized in the fixed resistor circuit illustrated in FIG. 1.

FIG. 1 illustrates a conventional light metering device 10 including a cadmium sulfide (CdS) cell 12 connected in series to a resistor 14. The light metering device 10 is coupled to a micro-controller 16 that controls the operation of various camera components (not shown) based on a light measurement signal generated by the light metering device 10. The micro-controller 16 includes an internal analog-to-digital (A/D) converter, processing unit and memory unit. An output terminal or line of the light metering device 10 is connected to an A/D input terminal of the micro-controller 16. The micro-controller 16 senses the voltage across the CdS cell 12, which is proportional to the light level of a scene to be photographed, using the internal A/D converter to generate a digital bit count level representative of the sensed voltage. The digital bit count level is used to address a look-up-table (LUT) stored in the memory unit of the micro-controller 16 to determine the actual light level, which is then subsequently used to make camera exposure setting adjustments. FIG. 2 is a graph illustrating the bit count versus light level response from minimum, nominal and maximum specified CdS cells to be utilized in the fixed resistor circuit illustrated in FIG. 1. In this example, the bit count is generated by an eight-bit A/D converter.

Figure 3:
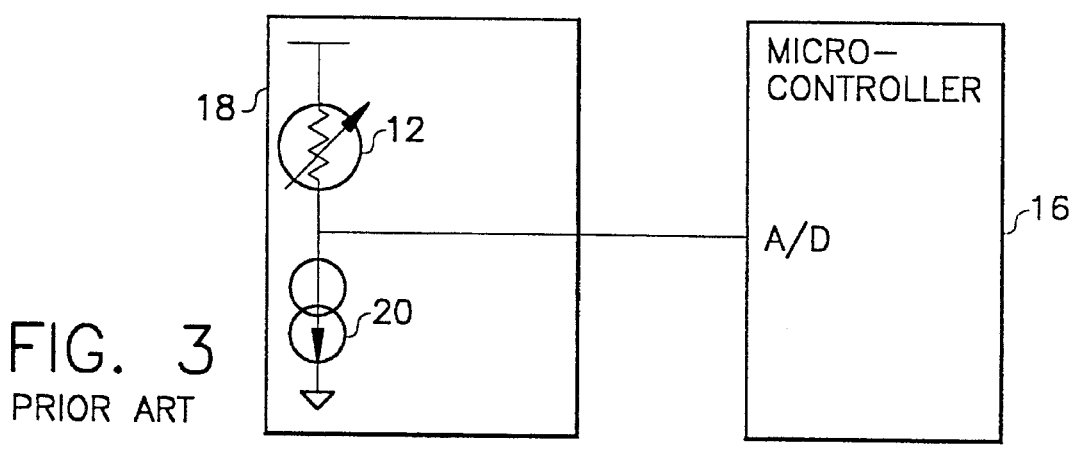
FIG. 3 illustrates a second conventional light metering device that uses a constant current controlled circuit in place of the fixed resistor circuit illustrated in FIG. 1.
Figure 4:
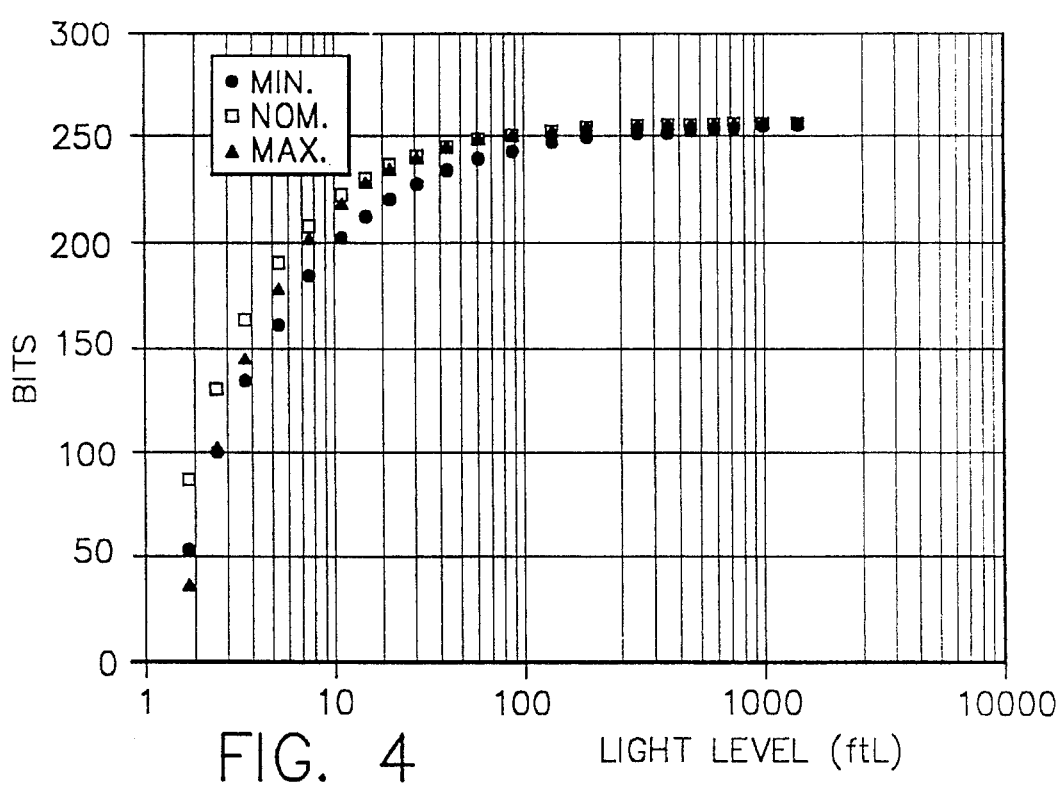
FIG. 4 is a graph illustrating a bit count versus light level response of minimum, nominal and maximum specified CdS cells to be utilized in the device illustrated in FIG. 3.

FIG. 3 illustrates a second conventional light metering device 18 that uses a constant current controlled circuit in place of the fixed resistor circuit illustrated in FIG. 1. The light metering device 18 includes the same type of CdS cell 12 utilized in the device illustrated in FIG. 1, but the resistor 14 is replaced by a current source 20. The light metering device 18 also has an output coupled to the A/D input of the micro-controller 16, which operates in the same manner described above to determine a light level reading. FIG. 4 is a graph illustrating a bit count versus light level response of minimum, nominal and maximum specified CdS cells to be utilized in the device illustrated in FIG. 3.

As is readily illustrated by FIGS. 2 and 4, both of the conventional light metering devices 10, 18 suffer from data compression. In the case of the fixed resistor circuit utilized in the light metering device 10 illustrated in FIG. 1, data compression occurs at both the high and low end of the light level range. In the case of the constant current controlled circuit utilized in the light metering device 18 illustrated in FIG. 3, the compression occurs primarily at the high end of the light level range causing the light level values to be indistinguishable from one another.

Figure 5:
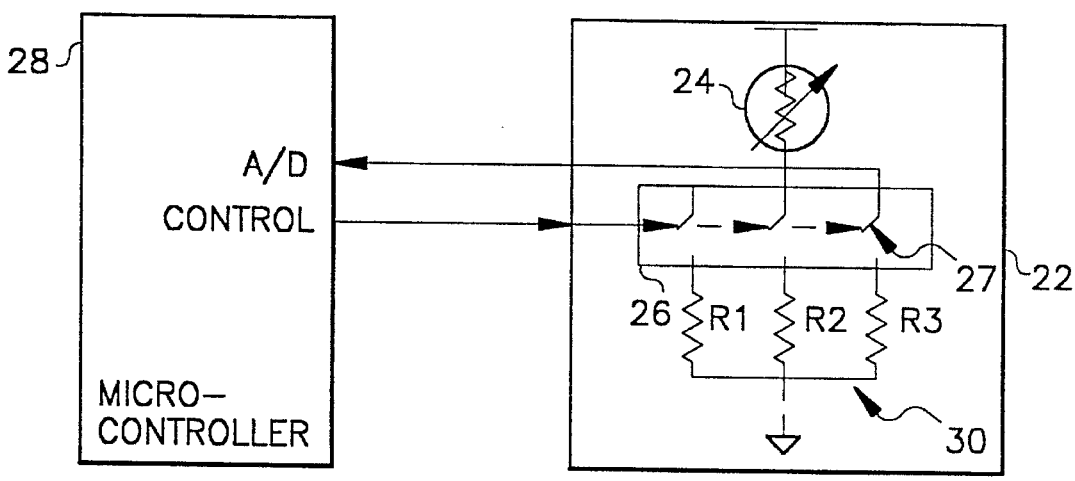
FIG. 5 is a schematic block diagram of a light metering device in accordance with a first embodiment of the invention.

Referring now to FIG. 5, a light metering device 22 in accordance with the invention is shown as including a light dependent resistor 24, for example a cadmium sulfide cell, a cadmium selenide cell or a sulfo-selenide cell, that is coupled to a selection mechanism 26. The selection mechanism 26 includes a plurality of switch elements 27 that are controlled by a control input which is coupled to a control output of a micro-controller 28. The selection mechanism 26 selectively connects the output of the light dependent resistor 24 to one of a plurality of circuit elements, namely resistors R1–R3, contained in a network 30 in response to a control signal received from the micro-controller 28. The micro-controller 28 also monitors the voltage across the light dependent resistor 24 using an internal A/D converter that is coupled to the output of the light dependent resistor by an A/D input line.

Figure 6:
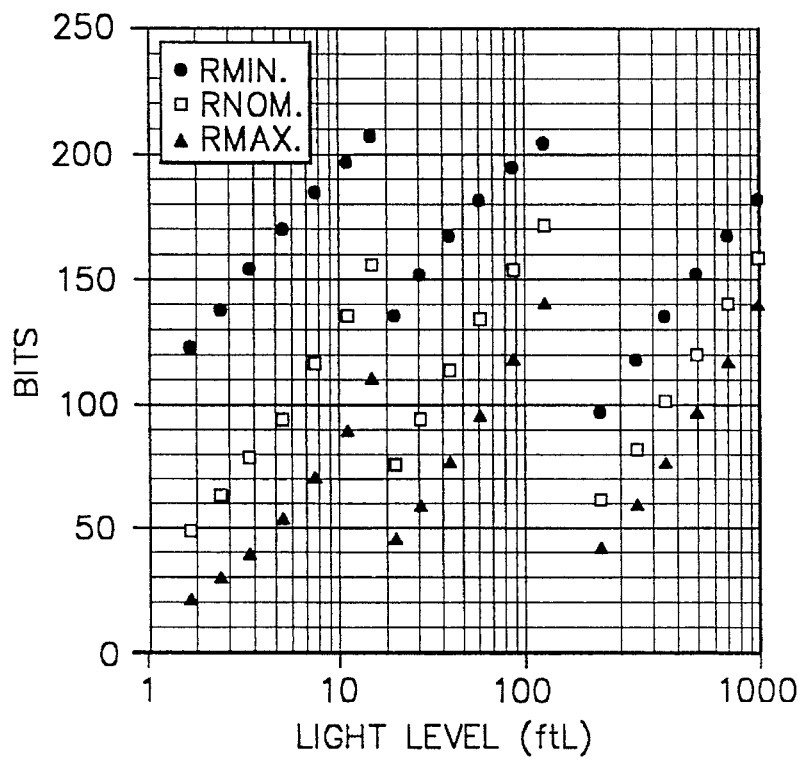
FIG. 6 illustrates a digital bit count response at different light levels for resistors R1–R3 in the device illustrated in FIG. 5.

FIG. 6 illustrates the bit count response values at different light levels for resistors R1–R3 in the device illustrated in FIG. 5. The response values are incorporated into three LUTs illustrated in FIG. 7, which are stored in an internal memory unit of the micro-controller 28. In contrast to the response illustrated in FIG. 2, the data is not compressed at either the high end or the low end for each of the resistors R1–R3. The resistance can be controlled by the selection mechanism 26 when the response for any one selected resistor reaches a maximum or minimum threshold, thereby increasing the usable light level range of the light metering device 22. For example, if resistor R3 is coupled to the light dependent resistor 24 and the digital bit count value exceeds a maximum threshold level shown in LUT3, namely 110 bits, the micro-controller 28 commands the selection mechanism 26 to switch to resistor R2 to lower the bit count value. If the digital bit count value exceeds a maximum threshold level shown in LUT2, namely 140 bits, the micro-controller 28 commands the selection mechanism 26 to switch to resistor R1 to lower the bit count value.

Figure 8:
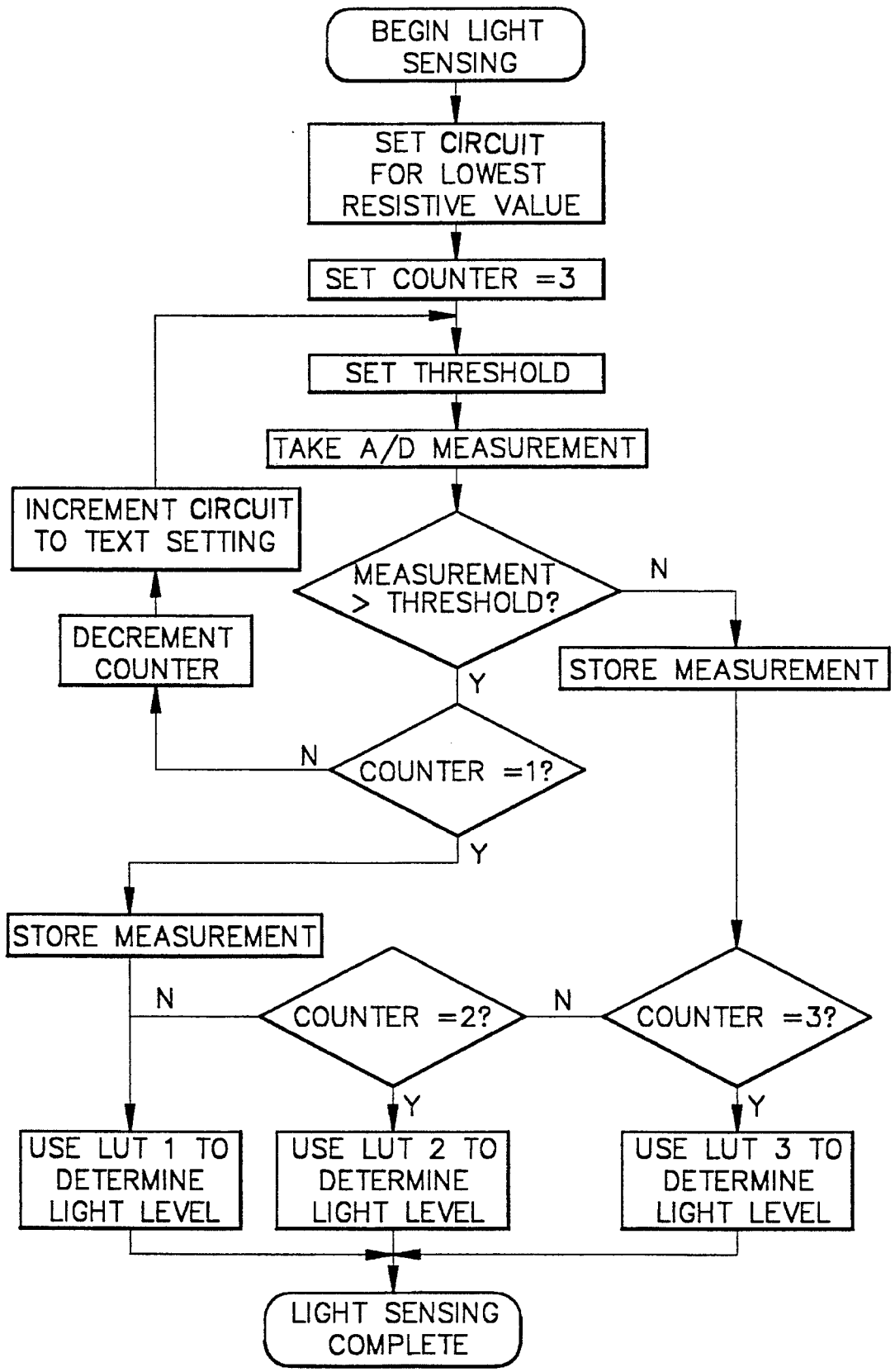
FIG. 8 is a flow diagram illustrating the operation of the micro-controller shown in FIG. 5 in greater detail.

FIG. 8 is a flow diagram illustrating the operation of the micro-controller 28 in greater detail. At the beginning of a light sensing operation, Step 50, the micro-controller 28 commands the selection mechanism 26 to connect the highest resistance value to the light dependent resistor 24. The micro-controller 28 then, at Step 51, sets an internal counter to a value of "3" corresponding to the number of resistors in the network 30. A threshold level corresponding to the selected resistor is then set, at Step 52, prior to taking a measurement of the voltage across the light dependent resistor 24 at Step 53. If, at query 54, the measurement exceeds the threshold level, indicative of an out-of-range condition, the count value is checked at query 55 to see if the last resistor has be utilized. If the last resistor has not been utilized, the counter is decremented at Step 56 and the micro-controller 28 commands the selection mechanism 26 at Step 57 to switch to the next lowest resistor in the resistor network 30. The threshold level is then reset at 52 for the newly selected resistor and another voltage measurement is taken at 53. If the measurement does not exceed the threshold level, the measurement is stored at Step 58 and the count value is checked by queries 59 and 60 to determine which LUT 62 or 63 should be utilized to determine the actual light level value based on the measurement. If the measurement exceeds the threshold for all of the available resistors, as determined jointly by queries 54 and 55 the measurement is stored at Step 61 and the LUT 64 corresponding to the highest resistance value is used to generate the best approximate value for the light level.

Figure 9:
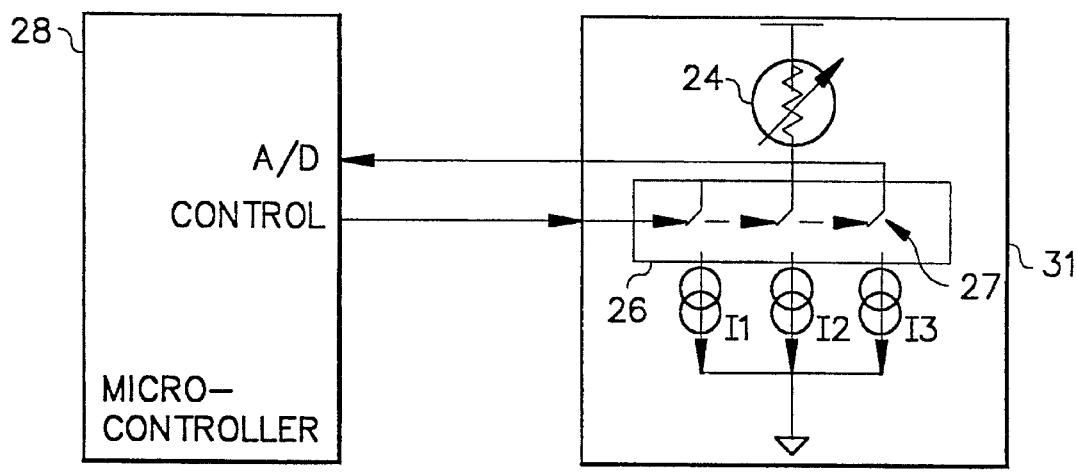
FIG. 9 illustrates a second embodiment of the invention in which the plurality of resistors illustrated in FIG. 5 are replaced by a plurality of current sources.
Figure 10:
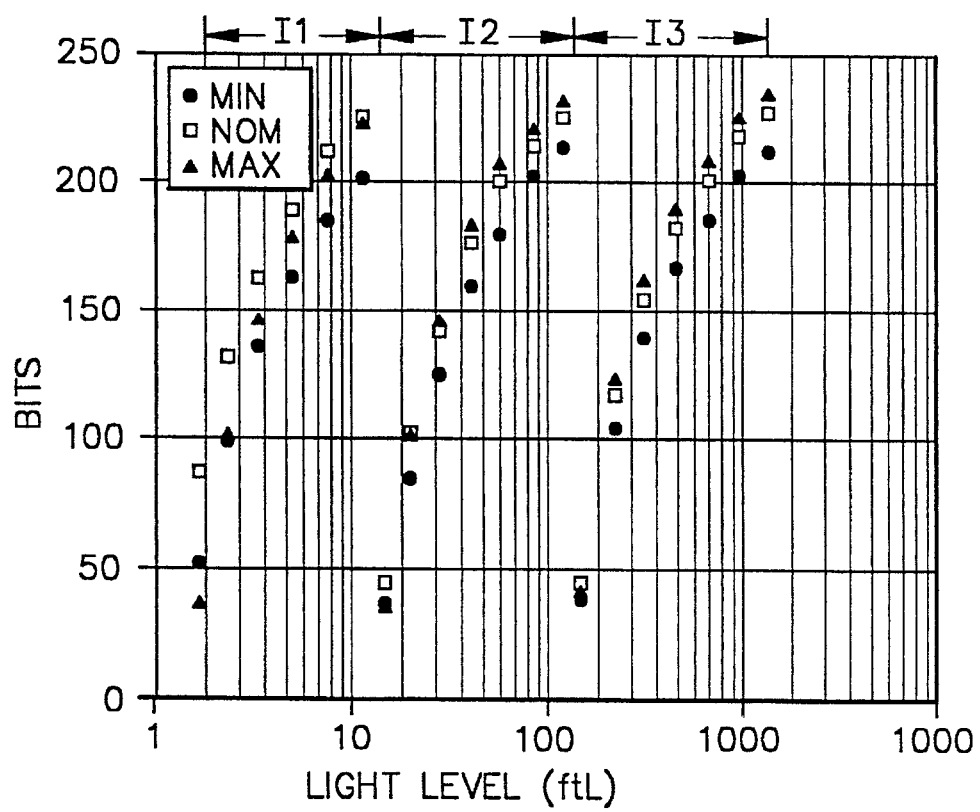
FIG. 10 is a graph illustrating the bit count versus light level response of the device illustrated in FIG. 9.

FIG. 9 illustrates a second embodiment of the invention in which the network of resistors are replaced by a network of current sources I1–I3. The operation of light metering device 31 illustrated in FIG. 9 is essentially identical to the light metering device 22 illustrated in FIG. 5, with the exception that the selection mechanism 26 selectively connects one of the plurality of current sources I1–I3 to the light dependent resistor 24. FIG. 10 is a graph illustrating the bit count versus light level response of the light metering device 31 illustrated in FIG. 9. FIG. 11 illustrates LUTs corresponding to the current sources I1–I3. In contrast to the graph shown in FIG. 4, the response is not compressed at the high count values.

Figure 12:
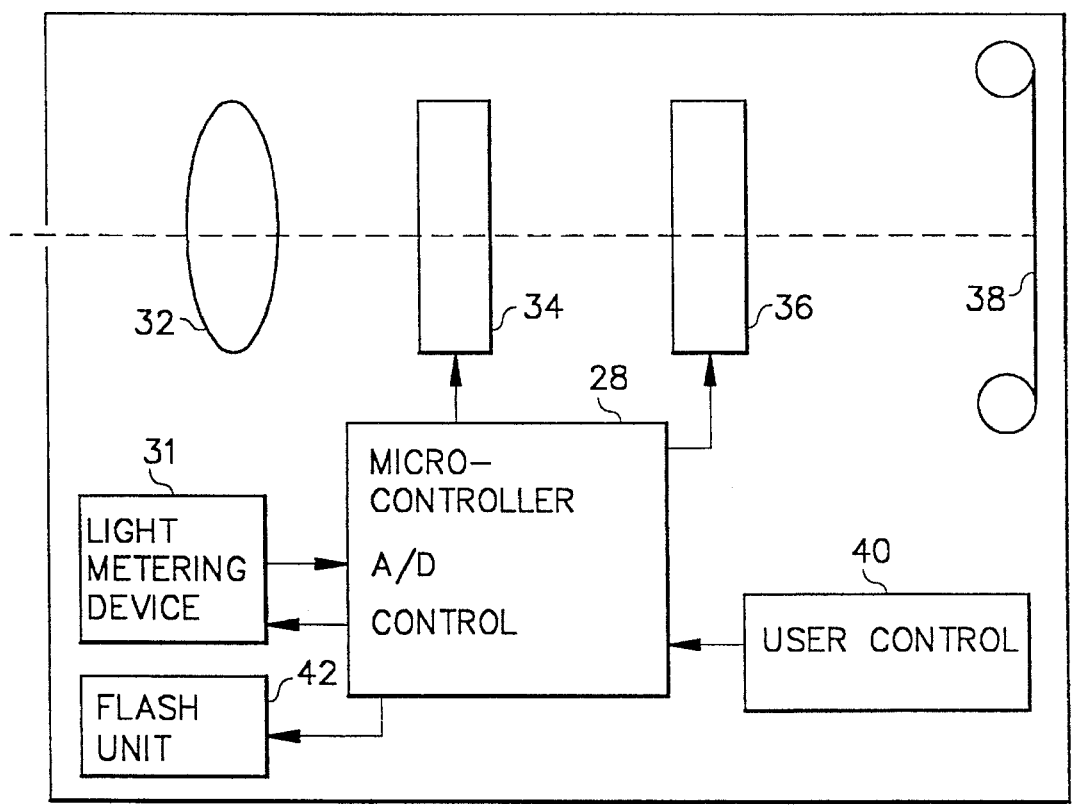
FIG. 12 is a schematic block diagram of a camera.

The light metering device according to the invention may be readily incorporated in both electronic and conventional photographic cameras. FIG. 12 is a schematic block diagram of a camera incorporating the light metering device of the invention. The camera includes a lens system 32, an adjustable aperture 34, an adjustable shutter mechanism 36, an imaging plane 38, a user control 40 and a flash unit 42. In the case of a conventional photographic camera, photographic film is located at the imaging plane 38 to capture an image. In the case of an electronic camera, an electronic image sensor is located at the imaging plane 38 to capture an image. The user control 40, for example an exposure activation switch, is provided to send a signal to the micro-controller 28 indicating that an imaging operation is to be performed. The micro-controller 28 performs the routine illustrated in FIG. 8 to generate a light value reading and sets the aperture 34 in response thereto. The micro-controller 28 then controls the operation of the aperture 34, the shutter 36 and flash unit 42 in response to the light value to properly expose the imaging plane 38 to scene light. Depending on the complexity of the camera, the micro-controller 28 may set the aperture, vary the shutter speed, set the charge level for the flash, set a flash quenching time, or perform some combination thereof, to provide proper exposure. Due to the wide variation in response of light dependent resistors, it is preferable to perform a calibration operation on the light metering device so that adjustment values can be supplied to the LUTs stored in the micro-controller 28.

The invention has been described with reference to certain preferred embodiments thereof. It will be understood, however, that modifications and variations are possible within the scope of the appended claims. For example, the number of resistors or current sources utilized in the light metering device may be varied. A variety of light dependent resistor may also be employed other than those specified above.

INDUSTRIAL UTILITY

The invention provides a light metering device incorporating a low cost light dependent resistor as a light sensing element, which can maintain its sensing function on a linear dynamic operating range over a broad range of light levels. The light metering device is particularly useful in both photographic and electronic cameras to perform a light measurement function, but can be utilized in any type of device requiring light measurement.

| Reference Numerals | |
| --- | --- |
| 10 | Light Metering Device |
| 12 | Cadmium Sulfide Cell |
| 14 | Resistor |
| 16 | Micro-controller |
| 18 | Light Metering Device |

-continued

| Reference Numerals | |
|---|---|
| 20 | Current Source |
| 22 | Light Metering Device |
| 24 | Light Dependent Resistor |
| 26 | Selection Mechanism |
| 27 | Switch Elements |
| 28 | Micro-controller |
| 30 | Network |
| 31 | Light Metering Device |
| 32 | Lens System |
| 34 | Adjustable Aperture |
| 36 | Adjustable Shutter |
| 38 | Imaging Plane |
| 40 | User Control |
| 42 | Flash Unit |

What is claimed is:

1. A light metering device comprising:

a light dependent resistor; a network including a plurality of circuit elements; selection means for selectively connecting the light dependent resistor to one of the plurality of circuit elements in the network; and control means for measuring a voltage at an output terminal of the light dependent resistor and controlling the operation of the selection means in response to said measured voltage to select one of the plurality of circuit elements in the network to set the voltage at the output terminal of the light dependent resistor within a predetermined threshold.

2. A light metering device as claimed in claim 1, wherein the light dependent resistor comprises a cadmium sulfide cell.

3. A light metering device as claimed in claim 1, wherein the light dependent resistor comprises a sulfo-selenide cell.

4. A light metering device as claimed in claim 1, wherein the light dependent resistor comprises a cadmium selenide cell.

5. A light metering device as claimed in claim 1, wherein the selection means comprises a selection mechanism including a plurality of switch elements and a control means, coupled to the selection means, for controlling the operation of the selection mechanism.

6. A light metering device as claimed in claim 5, wherein the control means includes an input terminal coupled to an output terminal of the light dependent resistor, and wherein the control means measures a voltage at the output terminal of the light dependent resistor and controls the operation of the selection mechanism to set the voltage at the output terminal within a predetermined threshold.

7. A light metering device as claimed in claim 1, wherein the circuit elements comprise resistors.

8. A light metering device as claimed in claim 1, wherein the circuit elements comprise current sources.

9. A camera comprising:

exposure means for exposing an image plane to scene light, said exposure means including at least one of an adjustable aperture, an adjustable shutter and a flash unit;

a light metering device including a light dependent resistor, a network including a plurality of circuit elements and selection means for selectively connecting the light dependent resistor to one of the plurality of circuit elements in the network; and control means for measuring a voltage at an output terminal of the light dependent resistor and controlling the operation of the selection means in response to said measured voltage to select one of the plurality of circuit elements in the network to set the voltage at the output terminal of the light dependent resistor within a predetermined threshold, wherein the control means controls the operation of the exposure means based on the voltage.

10. A camera as claimed in claim 9, wherein the light dependent resistor comprises a cadmium sulfide cell.

11. A camera as claimed in claim 9, wherein the light dependent resistor comprises a sulfo-selenide cell.

12. A camera as claimed in claim 9, wherein the light dependent resistor comprises a cadmium selenide cell.

13. A camera as claimed in claim 9, wherein the circuit elements comprise resistors.

14. A camera as claimed in claim 9, wherein the circuit elements comprise current sources.

* * * * *